(12) United States Patent
Moore et al.

(10) Patent No.: US 11,932,421 B2
(45) Date of Patent: Mar. 19, 2024

(54) METHODS AND SYSTEMS FOR MANUFACTURING A STRUCTURE

(71) Applicant: The Boeing Company, Chicago,, IL (US)

(72) Inventors: Matthew B. Moore, Edmonds, WA (US); Patrick B. Stone, Monroe, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/048,876

(22) Filed: Oct. 24, 2022

(65) Prior Publication Data
US 2023/0138523 A1 May 4, 2023

Related U.S. Application Data

(60) Provisional application No. 63/274,973, filed on Nov. 3, 2021.

(51) Int. Cl.
B64F 5/10 (2017.01)

(52) U.S. Cl.
CPC .................... B64F 5/10 (2017.01)

(58) Field of Classification Search
CPC .................... B64F 5/10; B64F 5/50
See application file for complete search history.

(56) References Cited

U.S. PATENT DOCUMENTS

| 4,382,728 | A | 5/1983 | Anderson et al. |
| 4,486,128 | A | 12/1984 | Baker et al. |
| 5,088,609 | A | 2/1992 | Fryc |
| 5,817,269 | A | 10/1998 | Younie et al. |
| 6,430,796 | B1 | 8/2002 | Jones et al. |
| 7,273,333 | B2 | 9/2007 | Buttrick et al. |
| 7,334,673 | B2 | 2/2008 | Boberg et al. |
| 7,574,933 | B2 | 8/2009 | Hazlehurst et al. |
| 8,005,563 | B2 | 8/2011 | Cobb et al. |
| 8,606,388 | B2 | 12/2013 | Cobb et al. |
| 8,620,470 | B2 | 12/2013 | Cobb et al. |
| 8,733,707 | B2 | 5/2014 | Stone |
| 9,651,935 | B2 | 5/2017 | Stone |
| 9,981,367 | B2 | 5/2018 | Nestleroad et al. |
| 10,442,153 | B2 | 10/2019 | Shinozaki et al. |
| 10,520,933 | B2 | 12/2019 | Stone et al. |
| 10,710,327 | B2 | 7/2020 | Butler |
| 10,711,815 | B2 | 7/2020 | Chan et al. |

(Continued)

FOREIGN PATENT DOCUMENTS

| EP | 2 965 836 | 1/2016 | |
| EP | 2965836 A1 * | 1/2016 | ............... B21J 15/02 |

OTHER PUBLICATIONS

Netherlands Patent Office, Search Report and Written Opinion, App. No. NL2029838 (dated Aug. 24, 2022).

(Continued)

Primary Examiner — Jason L Vaughan
Assistant Examiner — Amanda Kreiling
(74) Attorney, Agent, or Firm — Walters & Wasylyna LLC

(57) ABSTRACT

A method for manufacturing a structure includes sensing activity in a workstation with at least one sensor. The method further includes transporting the structure to the workstation, engaging a telescoping platform with the structure, and releasing an access barrier after the engaging.

20 Claims, 14 Drawing Sheets

(56) References Cited

U.S. PATENT DOCUMENTS

| | | |
|---|---|---|
| 10,723,485 B2 | 7/2020 | Moore et al. |
| 10,906,158 B2 | 2/2021 | Newton |
| 10,919,746 B2 | 2/2021 | Harada |
| 11,007,766 B2 | 5/2021 | Bye |
| 2008/0084018 A1 | 4/2008 | Baumann et al. |
| 2014/0330433 A1 | 11/2014 | Ciarelli |
| 2019/0084193 A1 | 3/2019 | Riedel |
| 2020/0017238 A1* | 1/2020 | Weller .................... B64F 5/10 |
| 2020/0108949 A1 | 4/2020 | Watkins et al. |
| 2021/0095482 A1* | 4/2021 | Fleming .................. E04G 1/24 |

OTHER PUBLICATIONS

European Patent Office, Extended European Search Report, App. No. 22200547.2 (dated Mar. 2, 2023).

* cited by examiner

METHODS AND SYSTEMS FOR MANUFACTURING A STRUCTURE

PRIORITY

This application claims priority from U.S. Ser. No. 63/274,973 filed on Nov. 3, 2021.

FIELD

This application relates to the manufacturing of structures and, more specifically, to methods and systems for manufacturing composite aerospace structures.

BACKGROUND

Manufacturing of large structures in the aerospace industry typically requires manual processing, manually placing the structure into a workstation, and manually moving it out of the workstation. Additionally, movement of personnel into and out of the workstation is a manual process.

Safety hazards arise when personnel need to work directly on the structures, especially when high off the ground. Existing guard rails, gates, and doors are manually operated and, thus, pose safety hazards, including falls, for workers.

Further concerns arise regarding movement of structures within a workstation requiring manual processing as typical structures to keep structures in place do not close all gaps located along the length of the large structures.

Accordingly, those skilled in the art continue with research and development efforts in the field of manufacturing large structures.

SUMMARY

Disclosed are methods for manufacturing a structure.

In one example, the disclosed method for manufacturing a structure includes sensing activity in a workstation with at least one sensor. The method further includes transporting the structure to the workstation, engaging a telescoping platform with the structure, and releasing an access barrier after the engaging.

In another example, the disclosed method for manufacturing a structure includes sensing activity in a workstation with at least one sensor, moving the structure into the workstation with an overhead gantry system, sensing the structure with at least one sensor after the moving, engaging a telescoping platform with the structure at a contact force range of approximately 2 pounds (lbs) to approximately 4 pounds (lbs), releasing an access barrier after engaging, and releasing at least one additional access barrier after engaging, wherein the moving, the engaging, and the releasing are automated.

Also disclosed are systems for manufacturing a structure.

In one example, the disclosed system for manufacturing a structure includes a control system configured to automate movement of the structure, a transportation apparatus configured to move the structure based upon a command from the control system, at least one sensor in communication with the control system, a workstation in communication with the control system, the workstation configured to receive the structure, a telescoping platform located in the workstation, and an access barrier adjoining the workstation.

In another example, the disclosed system for manufacturing a structure includes a control system configured to automate movement of the structure, a transportation apparatus configured to move the structure based upon a command from the control system, at least one sensor in communication with the control system, at least one guard rail defining a work zone, and a plurality of telescoping doors located behind the at least one guard rail, the plurality of telescoping doors defining a work zone platform.

Other examples of the disclosed methods and systems for manufacturing a structure will become apparent from the following detailed description, the accompanying drawings, and the appended claims.

DETAILED DESCRIPTION

Figure 1:
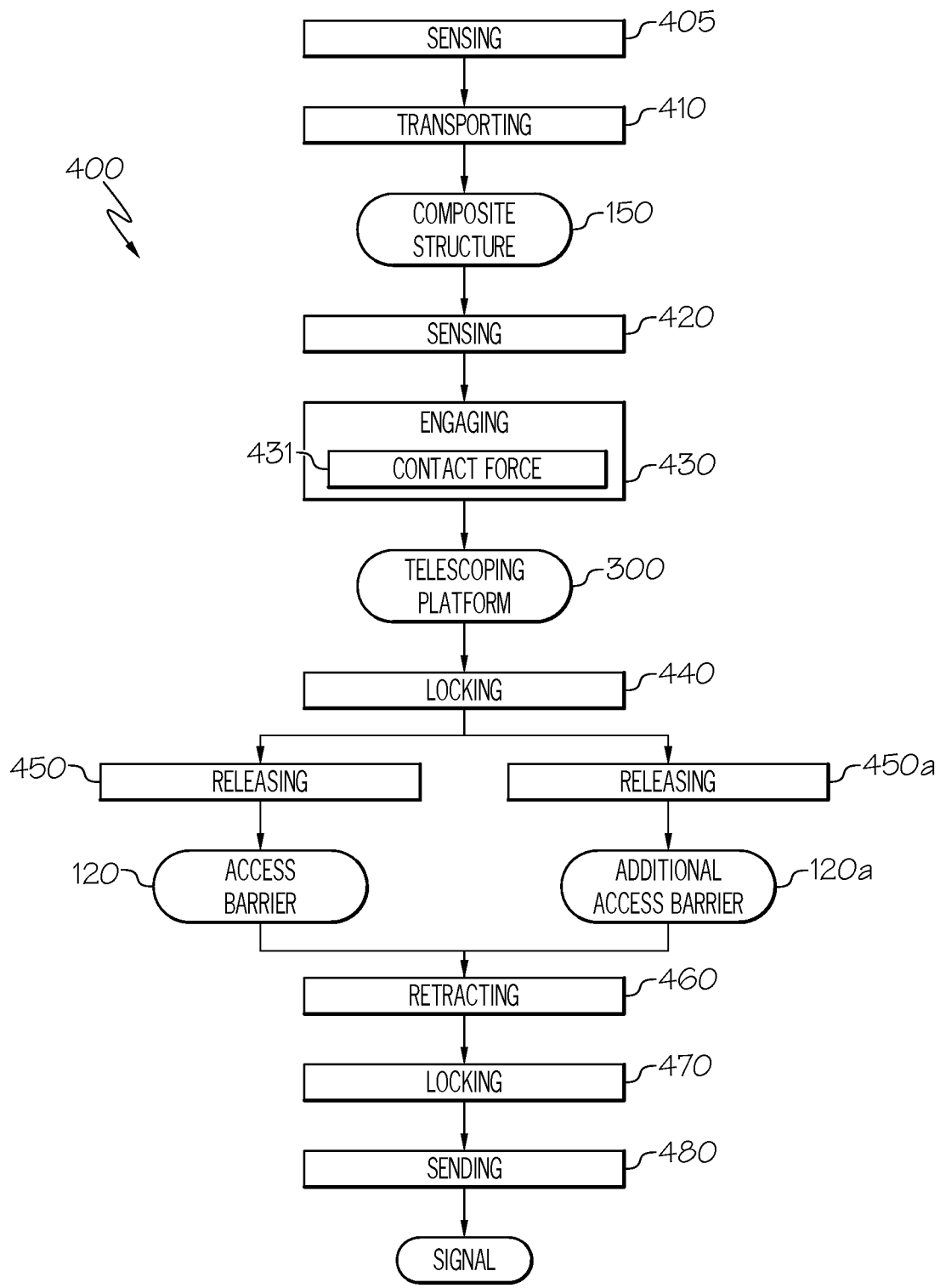
FIG. 1 is a flowchart depicting one example of the disclosed method for manufacturing a structure.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according to the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

References throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The disclosed method 400 and system 100 for manufacturing a structure address needs related to manufacturing large structures. Specifically, the disclosed method 400 and system 100 for manufacturing a structure address needs related to manually placing a workpiece into and out of a workstation 500, manually choreographing the movement of operators into and out of the workstation 500, reducing gaps between the workpiece and workstation 500, and deploying automated teledoors and other portions of a jig that need to be deployed to work upon the workpiece when in the workstation 500. The disclosed method 400 and system 100 for manufacturing a structure utilize a supervisory control and data acquisition (SCADA) based controller.

The supervisory control and data acquisition (SCADA) based controller for the disclosed system 100 and method 400 for manufacturing a structure utilizes feedback control to ensure that the workstation 500 properly engages with the structure 150 and the operators. Much of the safety of the access barriers and the telescoping platforms is directed toward operator safety. The operators also need to be corralled and pushed out of the workstation 500 when the structure 150 is ready to move out and until the next structure is seated in the workstation 500. Sensing the structure 150, location of operators, and status of access barriers is critical during processing. The operators within the workstation 500 are sensed and tracked through motion detection, lasers, optical sensors, worn or carried RFID chips, or mobile devices including cell phones and tablets.

Referring to FIG. 1, disclosed is a method 400 for manufacturing a structure 150. The method 400 is automated such that each step is performed automatically based upon data analysis and commands received from a control system 600. The method 400 includes sensing 405 activity in a workstation 500 with a least one sensor 115. The activity sensed may include presence and/or movement of operators, robots, access barrier 120, and structure 150. The sensing 405 may include sensing 405 movement of a structure 150, position of an access barrier 120, position of a telescoping platform 300, and presence of operators within the workstation 500. The sensing 405 may be performed with at least one sensor 115.

Still referring to FIG. 1, the method 400 for manufacturing a structure includes transporting 410 the structure 150 to a workstation 500, such as a sanding station. The transporting 410 may be automated, manual, or a combination thereof. The transporting 410 includes moving the structure 150 with a transportation apparatus 200. In one example, the transportation apparatus 200 includes an overhead gantry system 210, see FIG. 2. The transporting 410 is initiated upon instruction via a command 927 from the control system 600.

Figure 12:
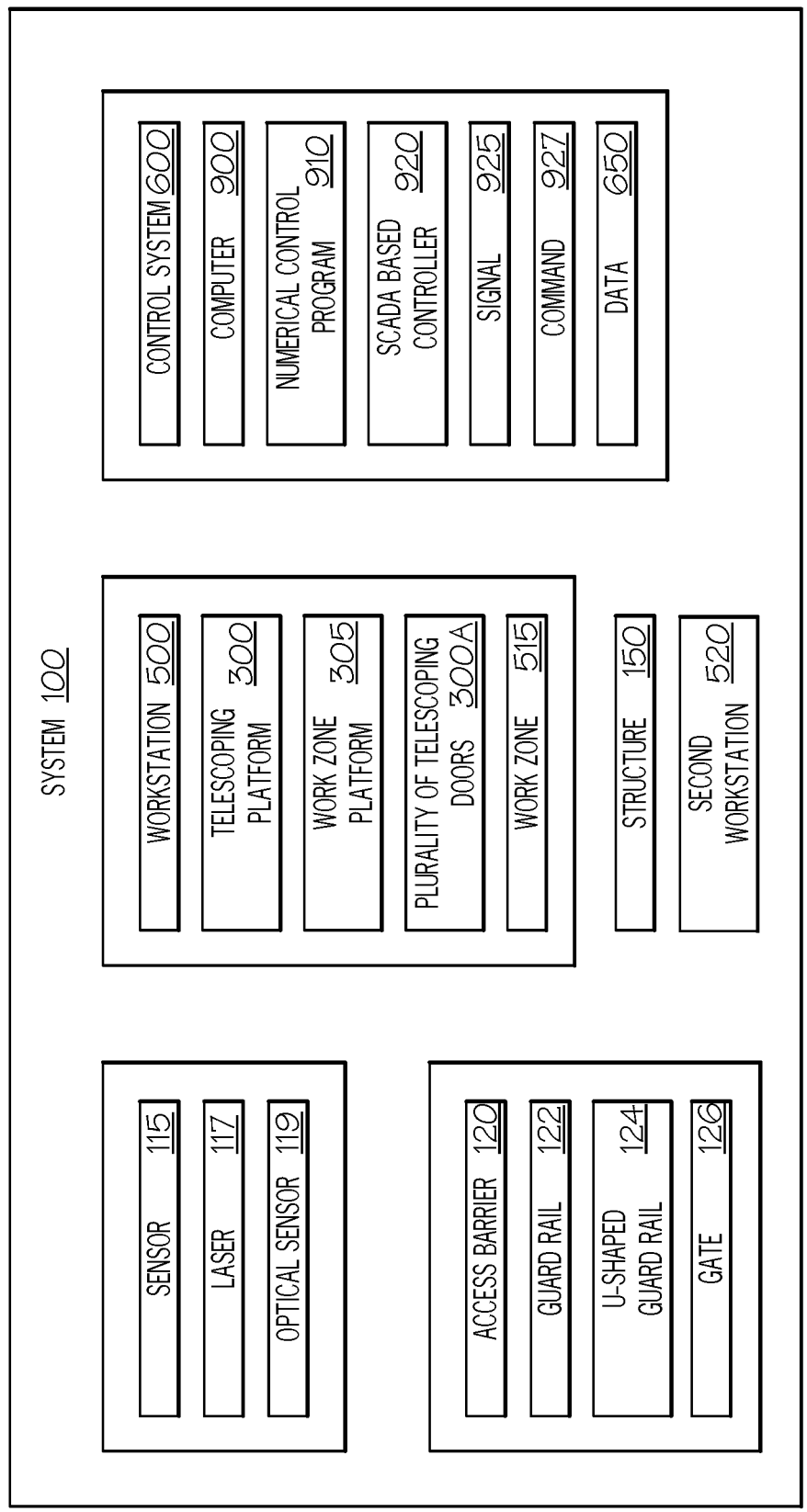
FIG. 12 is a block diagram depicting an example of the disclosed system for manufacturing a structure.

Referring FIG. 12, the transportation system 200 and workstation 500 are in communication with a computer 900 of the control system 600. The computer 900 may utilize one or more numerical control program 910 to direct transporting 410. The computer 900 further utilizes a supervisory control and data acquisition (SCADA) based controller 920 to direct transporting and facilitate data analytics. In one example, the transporting 140 is initiated when 1) a first workstation 510 sends a ready to send signal 915 to the supervisory control and data acquisition (SCADA) based controller 920 based upon completion of work in the first workstation 510 and 2) a second workstation 520 sends a ready to receive signal 925 to the supervisory control and data acquisition (SCADA) based controller 920. The ready to receive signal 925 is sent when the second workstation 520 is cleared of personnel and it is safe for transportation 410 to commence.

Referring to FIG. 1, the method 400 for manufacturing a structure includes sensing 420 the structure 150 with at least one sensor 115. The sensing 420 is performed before the transporting 410, after the transporting 410 or both before and after the transporting 410. In one example, the sensing 420 comprises obtaining an image of the structure 150. In another example, the sensing 420 comprises obtaining data with at least one laser 117. The sensing 420 may further include sharing the data obtained with the at least one sensor 115 with the control system 600.

Still referring to FIG. 1, the method 400 for manufacturing a structure includes engaging 430 a telescoping platform 300 with the structure 150. The engaging 430 may be automated, manual, or a combination thereof. In one example, the engaging 430 is performed at a contact force 431 range of approximately 2 lbs to approximately 4 lbs. In another example, the engaging 430 is performed at a contact force 431 range of approximately 3 lbs. The engaging 430 may initiate based upon receipt of a command 927 from the control system 600 indicating that the structure 150 is located in the workstation 500 and ready for deployment of the telescoping platform 300.

Figure 6:
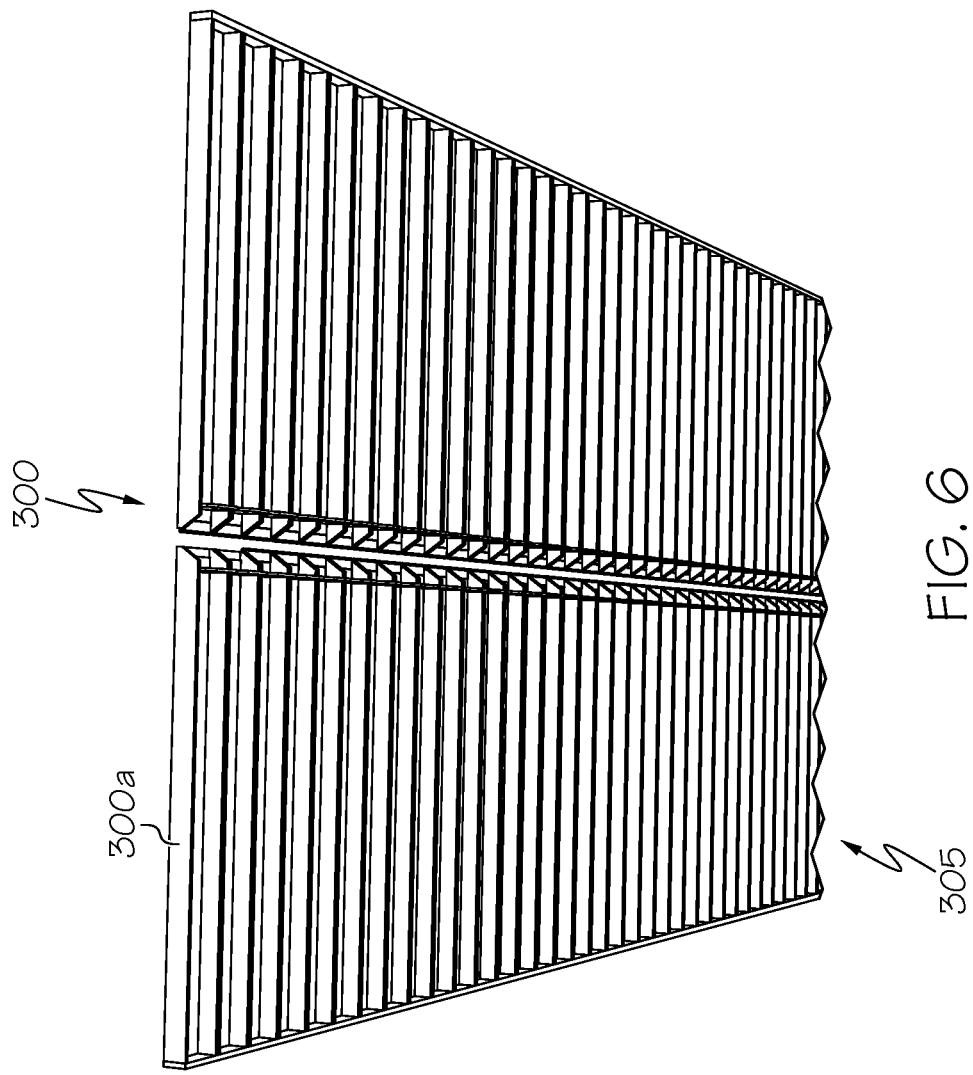
FIG. 6 is a perspective view of a portion of the system of FIG. 2.
Figure 7:
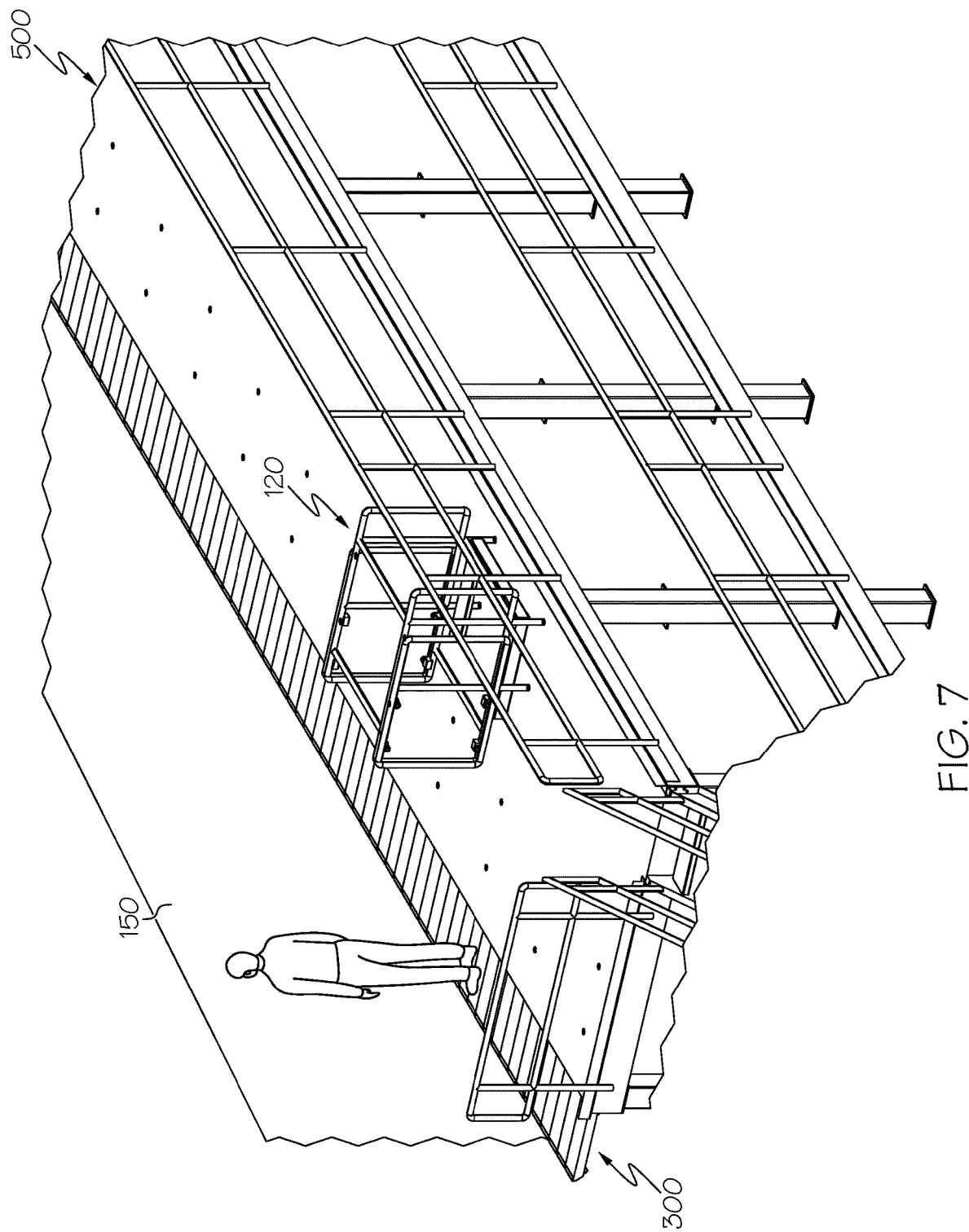
FIG. 7 is a perspective view of a portion of an example system for manufacturing a structure.

Referring to FIG. 6, the telescoping platform 300 includes a plurality of telescoping doors 300a. The telescoping platform 300 may include two panels laterally opposed from each other and configured to contact the structure 150 on opposing surfaces. The plurality of telescoping doors 300a are configured to contact the structure 150 and create a no gap work zone platform 305. The work zone platform 305 is configured to provide a working surface for operators, robots, or a combination thereof. The telescoping platform 300 further serves as a means for holding the structure 150 in place while operators and/or robots perform work on the structure 150.

The method 400 for manufacturing a structure may further include locking 470 the telescoping platform 300 after the engaging. The locking 470 may be automated such that it occurs based upon receipt of a command 927 from the control system 600 that the telescoping platform 300 is fully deployed and in contact with the structure 150.

Referring back to FIG. 1, the method 400 for manufacturing a structure includes releasing 450 an access barrier 120 after the engaging 430. In one example, the releasing 450 is automated such that it occurs based upon receipt of a command 927 from the control system 600 that the engaging 430 is complete and a work zone platform 305 is ready to receive operators.

Figure 10:
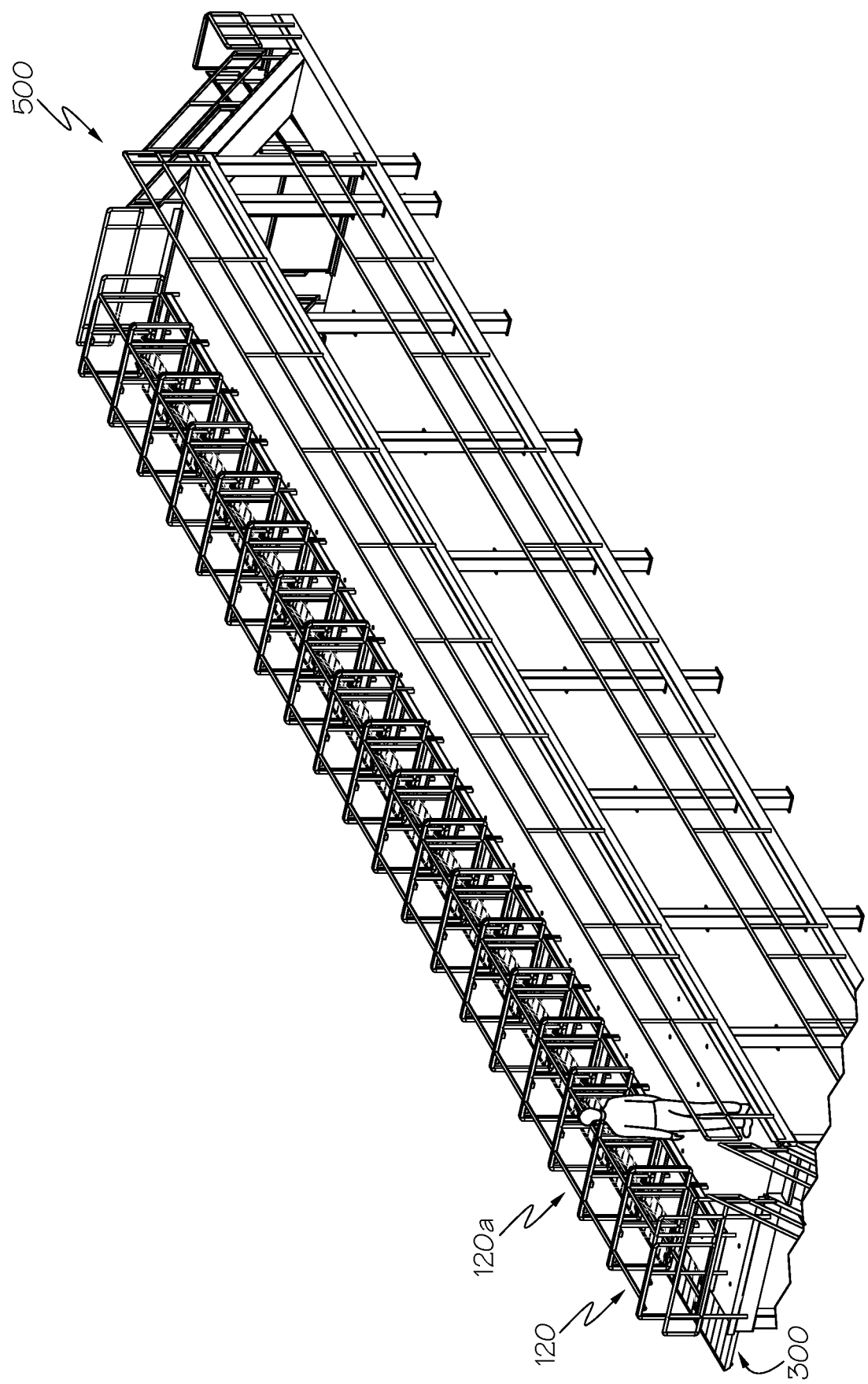
FIG. 10 is a perspective view of a portion of an example system for manufacturing a structure.
Figure 11:
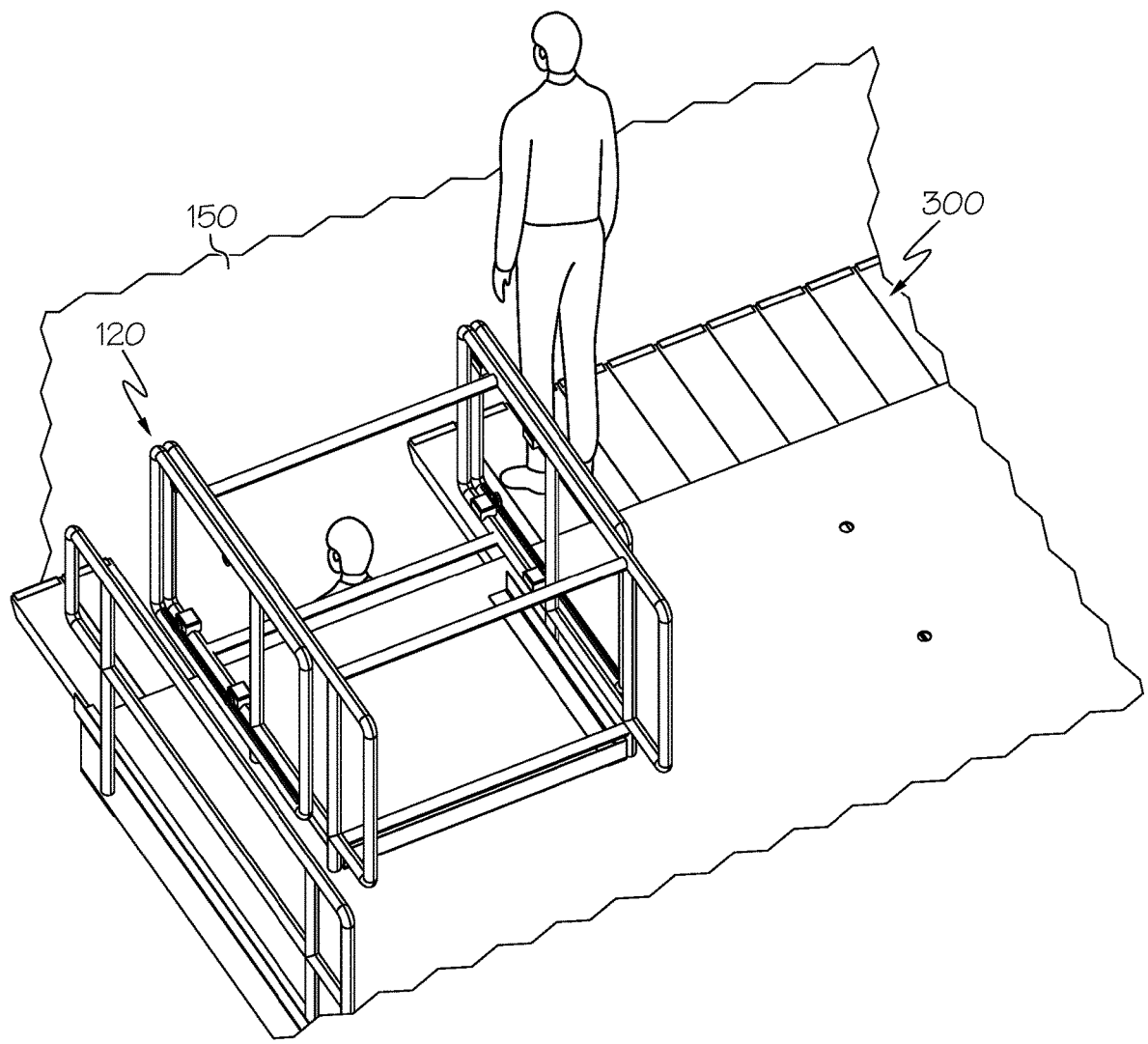
FIG. 11 is a perspective view of a portion of an example system for manufacturing a structure.

The access barrier 120 is designed to protect operators from entering the workstation 500 prior to engaging 430 the telescoping platform 300. The workstation 500 includes at least one access barrier 120. The workstation 500 may include more than one access barrier 120, see FIG. 10. In one example, the access barrier 120 comprises a u-shaped guard rail 122. In another example, the access barrier 120 comprises a gate 124. Once the releasing 450 occurs, the access barrier 120 is open and operators may safely enter the work zone 515.

Still referring to FIG. 1, the method 400 for manufacturing a structure includes releasing 450a at least one additional access barrier 120 after the engaging 430. In one example, the releasing 450a the at least one additional access barrier 120a is performed simultaneously with the releasing 450 an access barrier 120 after the engaging 430. In another example, the releasing 450a the at least one additional access barrier 120a is performed sequentially with the releasing 450 an access barrier 120 after the engaging 430. The releasing 450a is automated such that it occurs based upon receipt of a command 927 from the control system 600 that the engaging 430 is complete and a work zone platform 305 is ready to receive operators.

The method 400 for manufacturing a structure may further include retracting 460 the telescoping platform 300 after the releasing 450. The retracting 460 may be initiated upon receiving a signal 925 from the control system 600 indicating that no operators or robots are present in the work zone 515 and it is therefore safe to retract the telescoping platform 300.

The method 400 for manufacturing a structure may further include locking 470 the access barrier 120 after the retracting 460, just before the retracting 460, or simultaneously with the retracting 460. The locking 470 is automated such that it occurs based upon receipt of a command 927 from the control system 600 that the work zone 515 is free from operators and/or the retracting 460 has commenced, thus it is not safe for operators to be in the work zone 515.

The method 400 for manufacturing a structure may further include sending 480 a signal 925 to a control system 600. The sending 480 is based upon sensed data collected from the workstation 500 indicating the presence of operators, robots, the structure 150, and any other activity relevant to triggering an event in the workstation 500. The control system 600 may then analyze the signal 925 to determine next steps of the method 400 for manufacturing a structure.

Referring to FIG. 2-12, disclosed is a system 100 for manufacturing a structure 150. The system 100 is configured to automate movement of the structure 150 into and out of a workstation 500. The system 100 includes a control system 600. The control system 600 is configured to collect data 650, analyze the data 650, and initiate various functions in response to the data 650 collected and analyzed.

Referring to FIG. 12, the system 100 for manufacturing a structure includes at least one sensor 115. In one example, the sensor 115 is a laser 117. The sensor 115 may employ lidar technology, radar sensing, proximity sensing, and motion detection. In another example, the sensor 115 is an optical sensor 119. The sensor 115 is in communication with the control system 600 such that it may capture data 650 and relay it to the control system 600 for analysis.

Referring to FIG. 12, the system 100 for manufacturing a structure includes a transportation apparatus 200. The transportation apparatus 200 is configured to move the structure 150 based upon a command 927 from the control system 600. In one example, the transportation apparatus 200 includes an overhead gantry system 210. The overhead gantry system 210 may include at least one sensor 115 to collect data 650 in the workstation 500. The transportation system 200 is automated such that transportation of the structure 150 is dictated via at least one numerical control program 910, a supervisory control and data acquisition (SCADA) based controller 920, or a combination thereof. The transportation apparatus 200 includes a j-frame via ball index.

Figure 3:
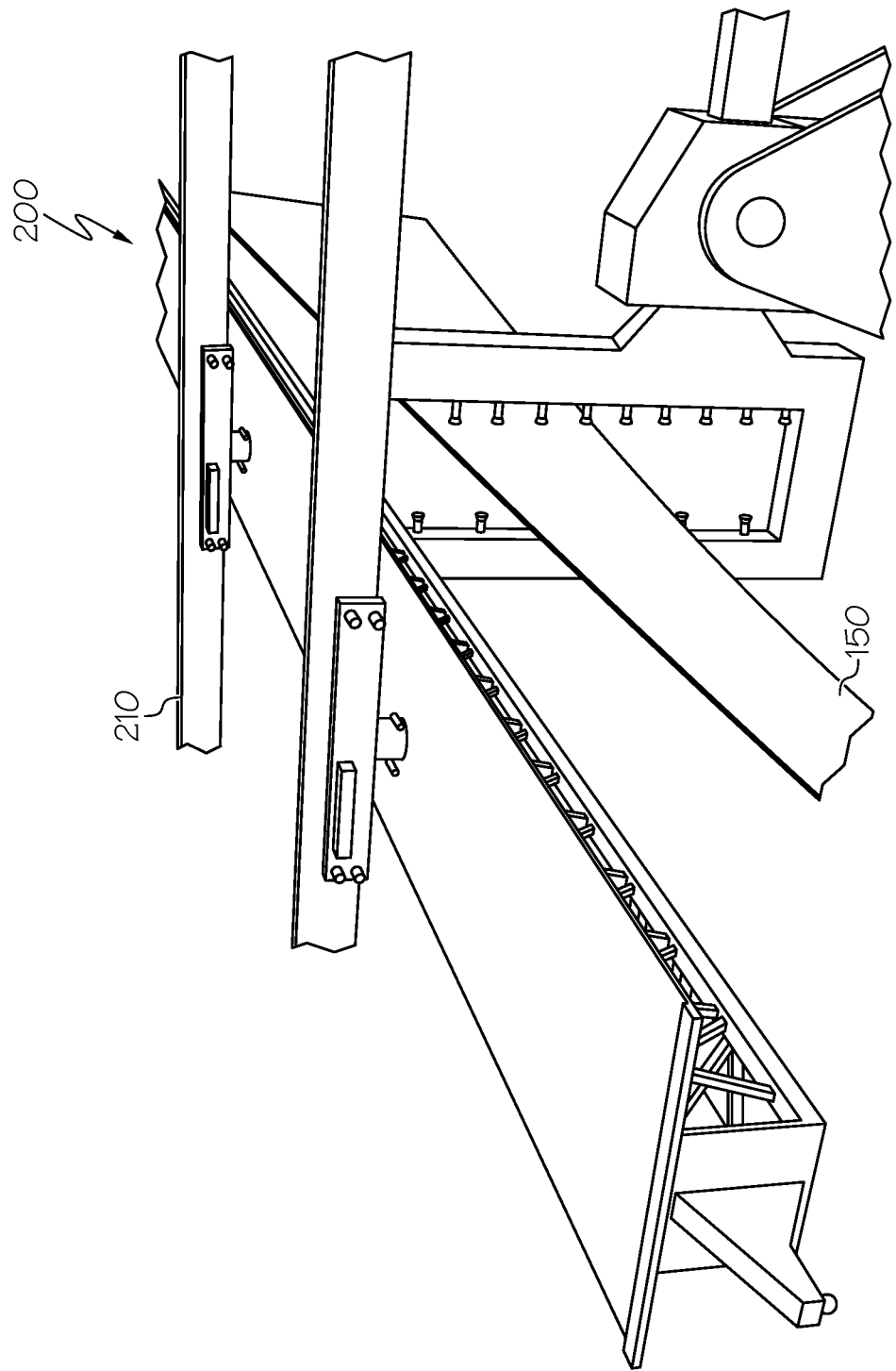
FIG. 3 is a perspective view of a portion of the system of FIG. 2.
Figure 4:
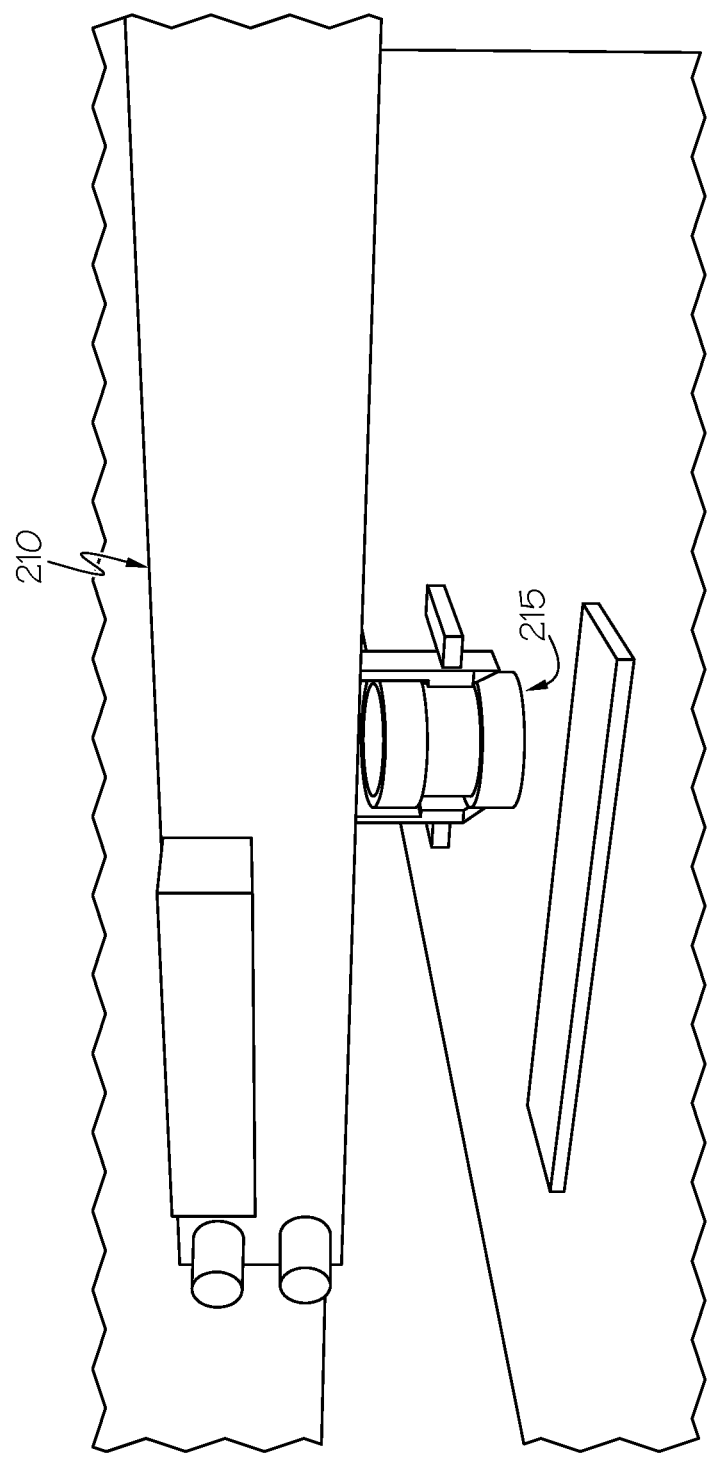
FIG. 4 is a perspective view of a portion of the system of FIG. 2.

Referring to FIG. 3 and FIG. 4, the overhead gantry system 210 includes two self-aligning interconnects 215. The supervisory control and data acquisition (SCADA) based controller 920 is in communication with the self-aligning interconnects 215 and is configured to send a signal based upon completion of interconnecting.

Figure 5:
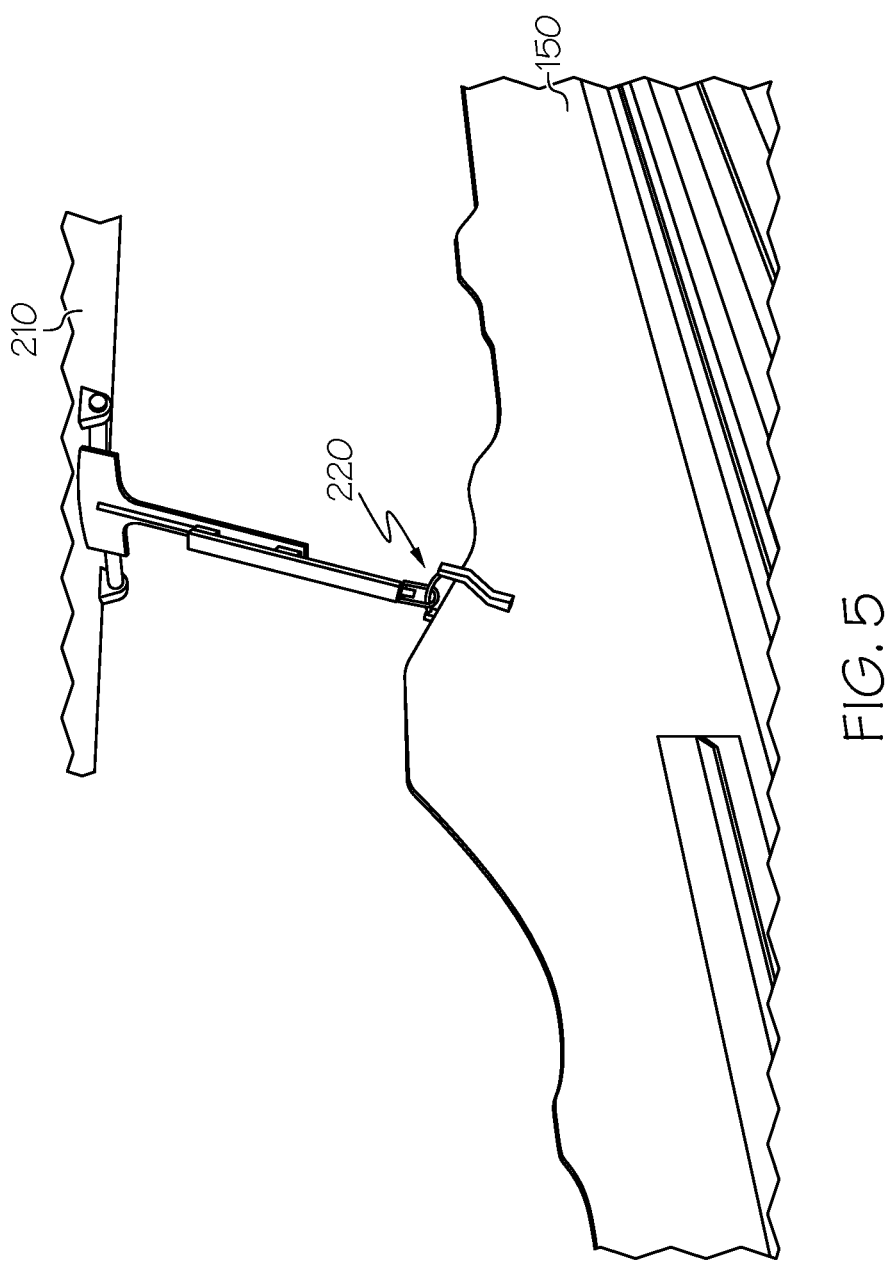
FIG. 5 is a perspective view of a portion of the system of FIG. 2.

Referring to FIG. 5, the system 100 for manufacturing a structure may include at least one panel holder 220. The panel holder 220 is configured to couple with the structure 150 and hold the structure 150 in a neutral attitude with no torque. In one example, the structure 150 includes at least one hole 152. The panel holder 220 couples with the hole 152 to suspend the structure 150 from the overhead gantry system 210.

Referring to FIG. 12, the system 100 for manufacturing a structure includes at least one workstation 500. The system 100 may further include a second workstation 520. The workstation 500 is in communication with the control system 600 such that functions occurring in the workstation 500 are automated based upon sending and receiving of a signal 925 and command 927. The workstation 500 is configured to receive the structure 150. In one example, the workstation 500 is a sanding station or an inspection station. In another example, the system 100 includes a first workstation 510 and a second workstation 520. The first workstation may be a trim station and the second workstation 520 may be a sanding station.

Referring to FIG. 12, the system 100 for manufacturing a structure includes a telescoping platform 300, see FIG. 7, FIG. 8, FIG. 9, and FIG. 11. The telescoping platform 300 includes a plurality of telescoping doors 300a. The plurality of telescoping doors 300a are configured to contact the structure 150 and create a no gap work zone platform 305. In another example, the system 100 includes more than one telescoping platform, see FIG. 2, such that an operator may access the structure 150 at one section and a different operator may access the structure 150 at a location above or below, see FIG. 11.

Figure 8:
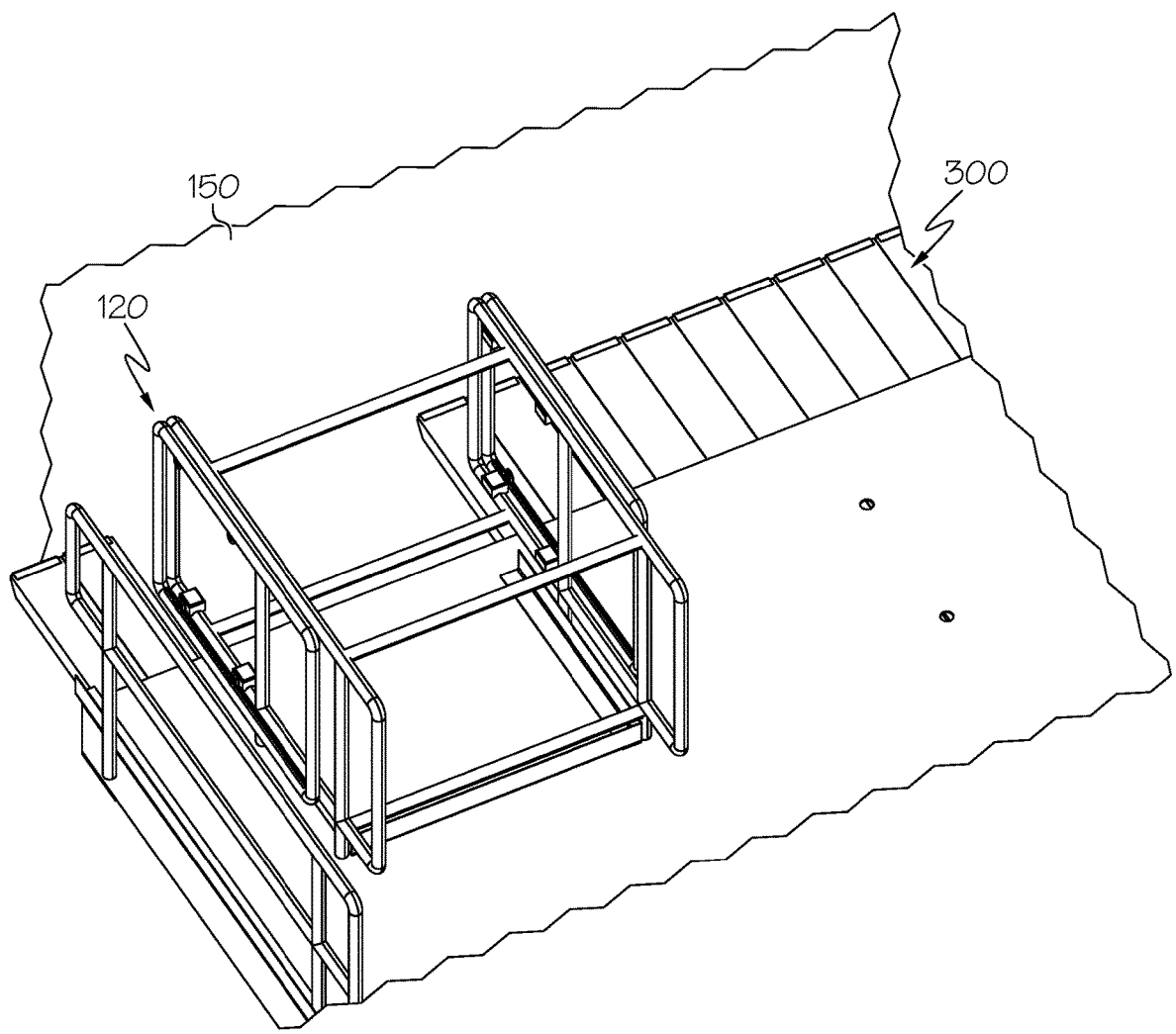
FIG. 8 is a perspective view of a portion of an example system for manufacturing a structure.
Figure 9:
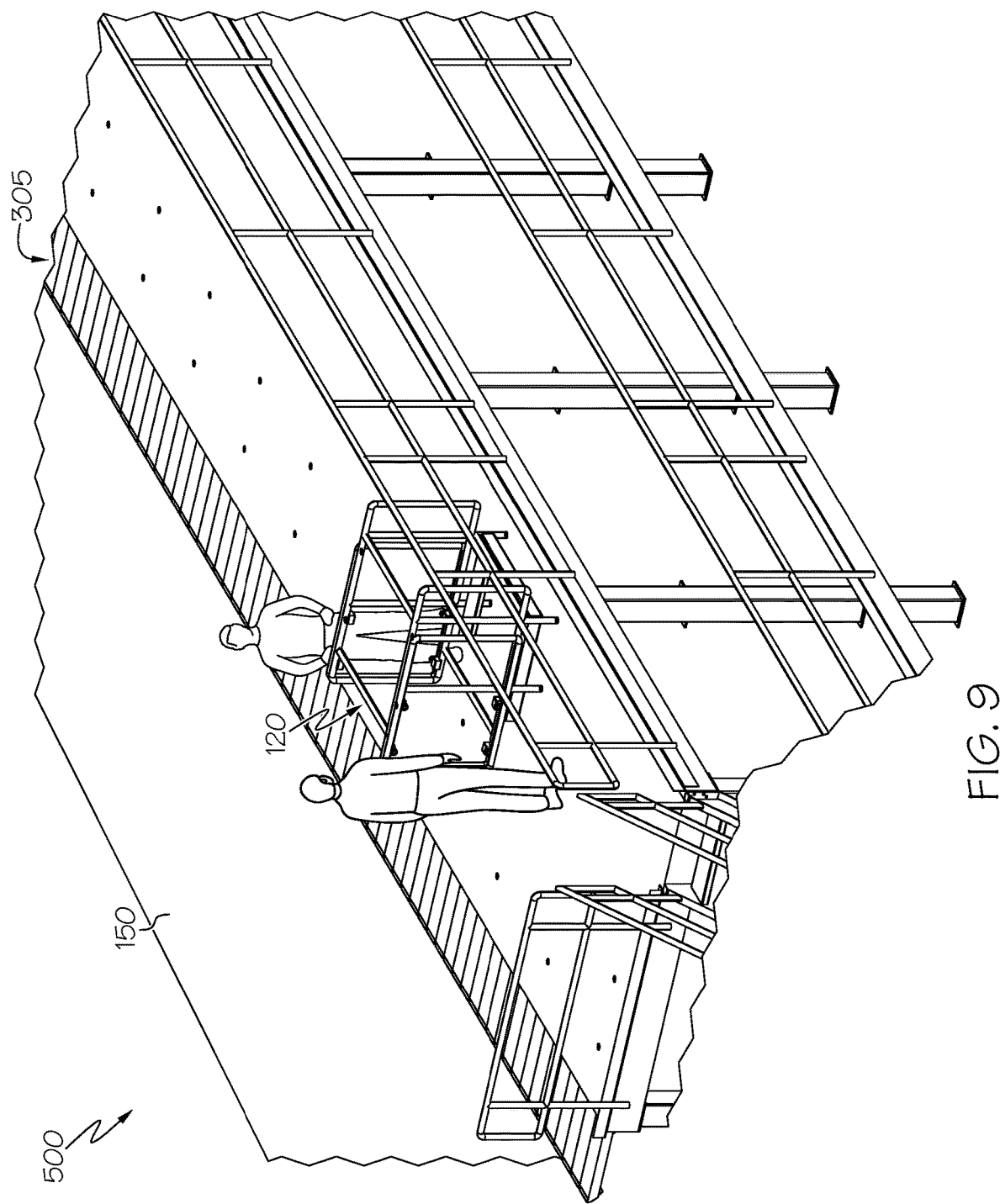
FIG. 9 is a perspective view of a portion of an example system for manufacturing a structure.

Referring to FIG. 8, FIG. 9, and FIG. 12, the system 100 for manufacturing a structure includes an access barrier 120. The system 100 may include more than one access barrier, see FIG. 10. The access barrier 120 is adjoining the workstation 500 such that it allows access to a work zone 515 in proximity to the structure 150. In one example, the access barrier 120 comprises a gate 124. In another example, the access barrier 120 comprises a u-shaped guard rail 122. The system 100 may further include at least one additional access barrier 120a. The access barrier 120 may include a sensor 115 for detection of operators and collection of data 650. The access barrier may further be in communication with the control system 600 for analysis of data 650 collected as well as automated locking and unlocking functionality.

Figure 2:
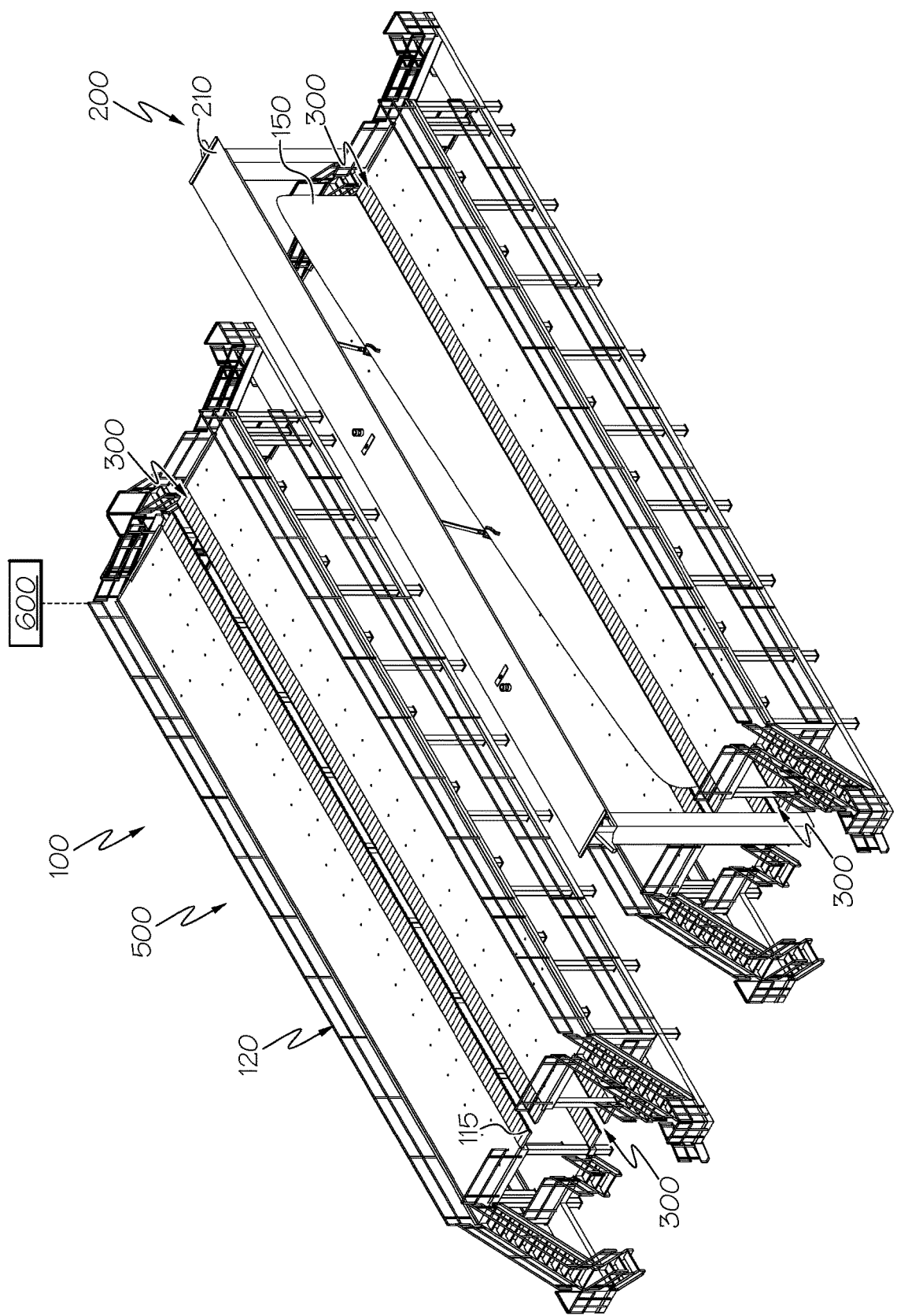
FIG. 2 is a perspective view of one example of the disclosed system for manufacturing a structure.

Referring to FIG. 2, the system 100 for manufacturing a structure includes a telescoping platform 300. The telescoping platform 300 is automated such that engagement and retraction of the telescoping platform 300 is based upon receipt of a command 927 from the control system 600. In one example, telescoping platform 300 includes a plurality of telescoping doors 300a. The plurality of telescoping doors 300a are located behind an access barrier 120. The plurality of telescoping doors 300a may include two panels laterally opposed from each other configured to contact the structure 150 on opposing surfaces. The telescoping platform 300 defines a work zone platform 305 for operators, robots, or any other machinery needed to work on the structure. Further, the plurality of telescoping doors 300a may be configured to hold the structure 150 in a predefined position. The plurality of telescoping doors 300a may include elastomeric-rubber-contact surfaces (protect-the-part (PTP)) type of bumpers at the contact surfaces to protect impact damage on the structure 150.

The structure 150 may be a structure of an airplane, such as a wing of an airplane. The structure 150 may include composite materials, metallic materials, or a combination thereof. The structure 150 may be a post-cure composite structure requiring further processing such as sanding, grinding, and finishing.

In one example, the system 100 for manufacturing a structure 150 includes a control system 600 configured to automate movement of the structure 150, a transportation apparatus 200 configured to move the structure 150 based upon a command 927 from the control system 600, at least one sensor 115 in communication with the control system 600, at least one guard rail 122 defining a work zone 515, and a plurality of telescoping doors 300a located behind the at least one guard rail 122, the plurality of telescoping doors 300a defining a work zone platform 305. In one example, the at least one sensor 115 is one of a laser 117, proximity sensor, motion detector, and lidar.

Figure 13:
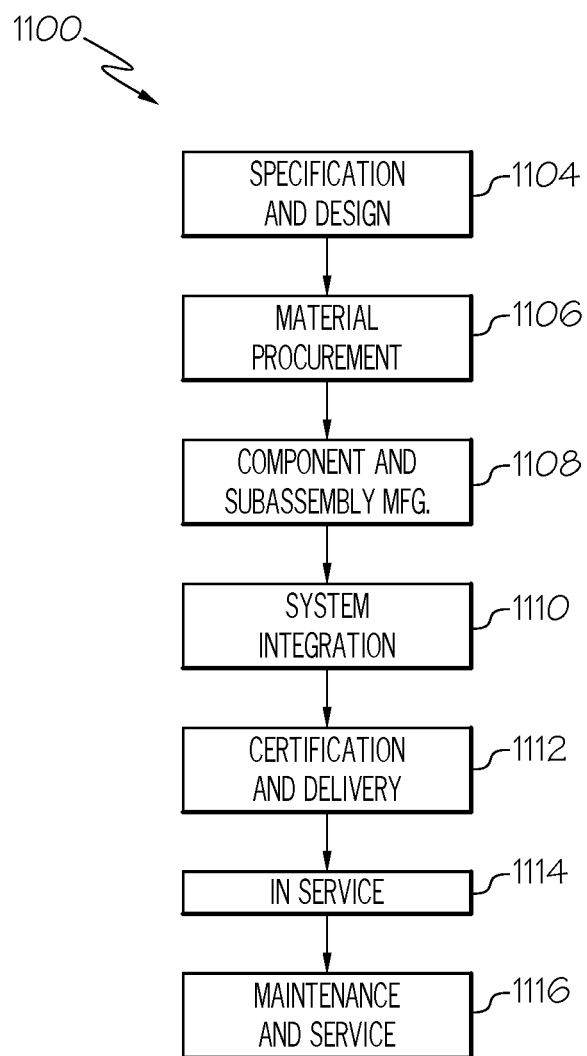
FIG. 13 is a flow diagram of an aircraft manufacturing and service methodology.
Figure 14:
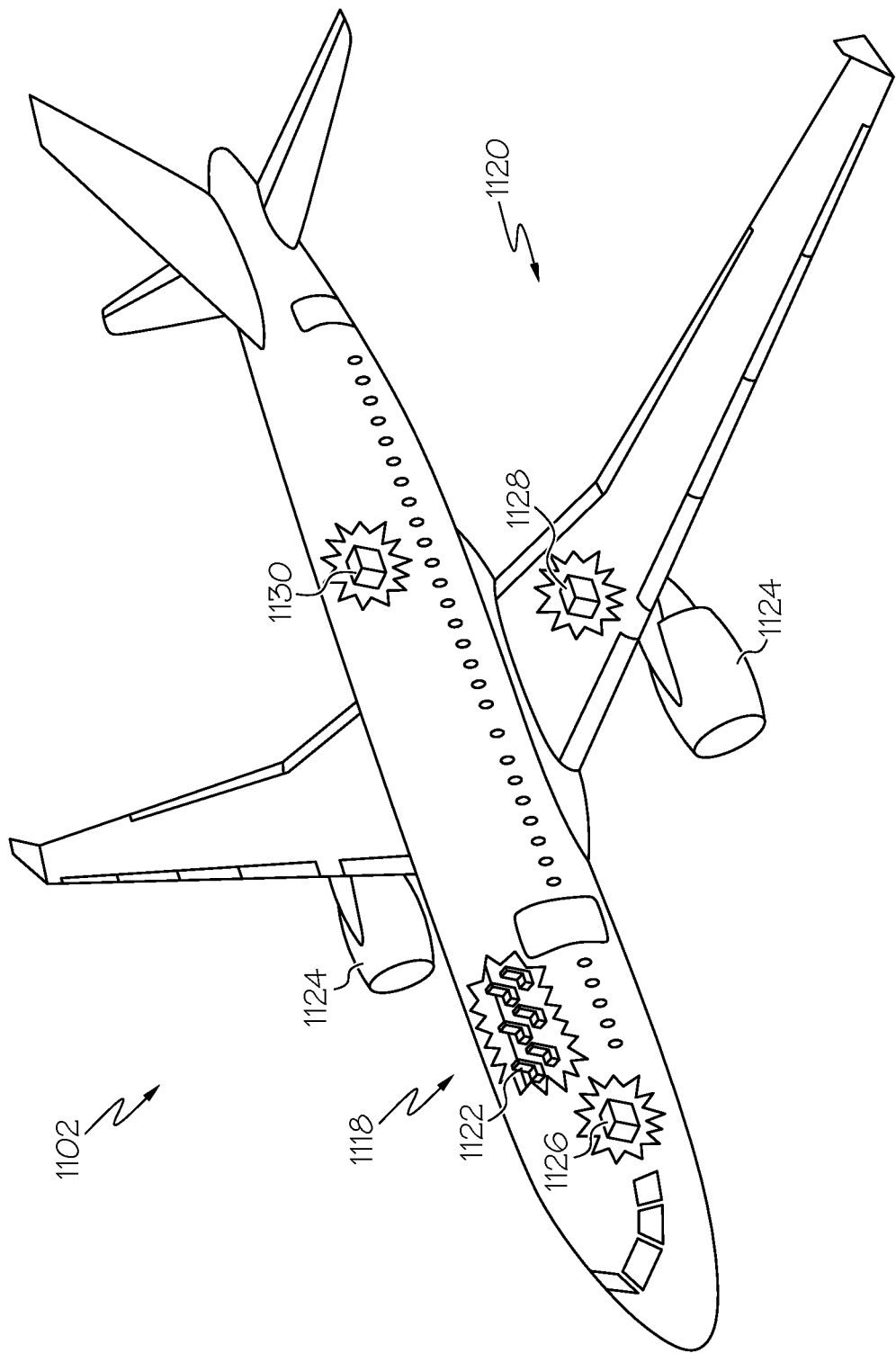
FIG. 14 is a schematic illustration of an aircraft.

Examples of the subject matter disclosed herein may be described in the context of aircraft manufacturing and service method 1100 as shown in FIG. 13 and aircraft 1102 as shown in FIG. 14. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 14, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

The disclosed methods and systems for manufacturing a structure shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the systems, methods, or combination thereof may be utilized during production stages (block 1108 and block 1110), for example, by substantially expediting assembly of or reducing the cost of aircraft 1102. Similarly, one or more examples of the systems or method realizations, or a combination thereof, may be utilized, for example and without limitation, while aircraft 1102 is in service (block 1114) and/or during maintenance and service (block 1116).

The disclosed methods and systems for manufacturing a structure are described in the context of an aircraft. However, one of ordinary skill in the art will readily recognize that the disclosed methods and systems for manufacturing a structure may be utilized for a variety of applications. For example, the disclosed methods and systems for manufacturing a structure may be implemented in various types of vehicles including, e.g., helicopters, watercraft, passenger ships, automobiles, and the like.

Although various examples of the disclosed methods and systems for manufacturing a structure have been shown and described, modifications may occur to those skilled in the art upon reading the specification. The present application includes such modifications and is limited only by the scope of the claims.

What is claimed is:

1. A method for manufacturing a structure, the method comprising:
sensing activity in a workstation with at least one sensor;
transporting the structure to the workstation;
engaging a telescoping platform with the structure; and
releasing an access barrier after the engaging.

2. The method of claim 1, wherein the engaging is performed at a contact force range of approximately 2 lbs to approximately 4 lbs.

3. The method of claim 1, wherein the transporting comprises moving the structure into the workstation with an overhead gantry system.

4. The method of claim 1, wherein the transporting, the engaging, and the releasing are automated.

5. The method of claim 1, further comprising:
sensing the structure with at least one sensor after the transporting.

6. The method of claim 5, wherein the sensing comprises obtaining an image of the structure.

7. The method of claim 5, wherein the sensing comprises obtaining data with at least one laser.

8. The method of claim 1, further comprising:
locking the telescoping platform after the engaging.

9. The method of claim 1, further comprising:
retracting the telescoping platform after the releasing.

10. The method of claim 1, further comprising:
locking the access barrier after the retracting.

11. The method of claim 1, wherein the structure is a wing of an airplane.

12. The method of claim 1, wherein the telescoping platform comprises a plurality of telescoping doors laterally opposed from each other.

13. A system for manufacturing a structure, the system comprising:
a control system configured to automate movement of the structure;
a transportation apparatus configured to move the structure based upon a command from the control system;
at least one sensor in communication with the control system;
a workstation in communication with the control system, the workstation configured to receive the structure;
a telescoping platform located in the workstation; and
an access barrier adjoining the workstation,
wherein the telescoping platform comprises a plurality of telescoping doors laterally opposed from each other.

14. The system of claim 13, wherein the transportation apparatus comprises an overhead gantry system comprising at least one sensor.

15. The system of claim 13, wherein the access barrier is a gate.

16. The system of claim 13, wherein the access barrier is a u-shaped guard rail.

17. The system of claim 13, wherein the at least one sensor is an optical sensor.

18. A system for manufacturing a structure, the system comprising:
a control system configured to automate movement of the structure;
a transportation apparatus configured to move the structure based upon a command from the control system;
at least one sensor in communication with the control system;
at least one guard rail defining a work zone; and
a plurality of telescoping doors located behind the at least one guard rail, the plurality of telescoping doors defining a telescoping platform that serves as the work zone.

19. The system of claim 18, wherein the transportation apparatus comprises an overhead gantry system.

20. The system of claim 18, wherein the at least one sensor is an optical sensor.

* * * * *